United States Patent [19]
McKay

[11] Patent Number: 5,706,255
[45] Date of Patent: Jan. 6, 1998

[54] TIMEKEEPING AND MAGNIFYING DEVICE

[76] Inventor: Christopher B. McKay, 24806 Handley Dr., Carmel, Calif. 93923

[21] Appl. No.: 519,294

[22] Filed: Aug. 24, 1995

[51] Int. Cl.[6] .................... G04B 47/00; G02B 27/02
[52] U.S. Cl. .................................. 368/10; 359/809
[58] Field of Search ........................ 368/10, 76, 80, 368/88, 276–278, 282–283, 286; 359/802, 804, 809, 811, 813, 815

[56] References Cited

U.S. PATENT DOCUMENTS

| | | |
|---|---|---|
| 2,679,785 | 6/1954 | Batt .................................. 368/283 |
| 3,444,685 | 5/1969 | Juillerat . |
| 4,451,117 | 5/1984 | Goode . |
| 4,972,394 | 11/1990 | Dimarco .............................. 368/227 |
| 4,991,935 | 2/1991 | Sakurai . |
| 5,183,193 | 2/1993 | Brandell . |

*Primary Examiner*—Vit W. Miska

*Attorney, Agent, or Firm*—Kolisch Hartwell Dickinson McCormack & Heuser

[57] ABSTRACT

A timekeeping and magnifying device includes a watch and a magnifying lens pivotally connected to the watch. The lens may be pivoted away from the face of the watch to magnify objects. The device may include a light adjacent the magnifying lens which enables the device to be used in dark areas. Additionally, the device may contain a fastener which restricts the magnifying lens from pivoting away from the face of the watch. In the preferred embodiment of the invention, the magnifying lens may be either pivoted about the hinge or detached from the watch. In alternate embodiments of the invention, a connecter removably holds the magnifying lens over the face of the watch. Furthermore, in other embodiments, the device further includes a second magnifying lens and a second hinge which cooperate with the first magnifying lens and the first hinge to form a telescope-like combination. A method for using the timekeeping and magnifying device also is disclosed.

16 Claims, 2 Drawing Sheets

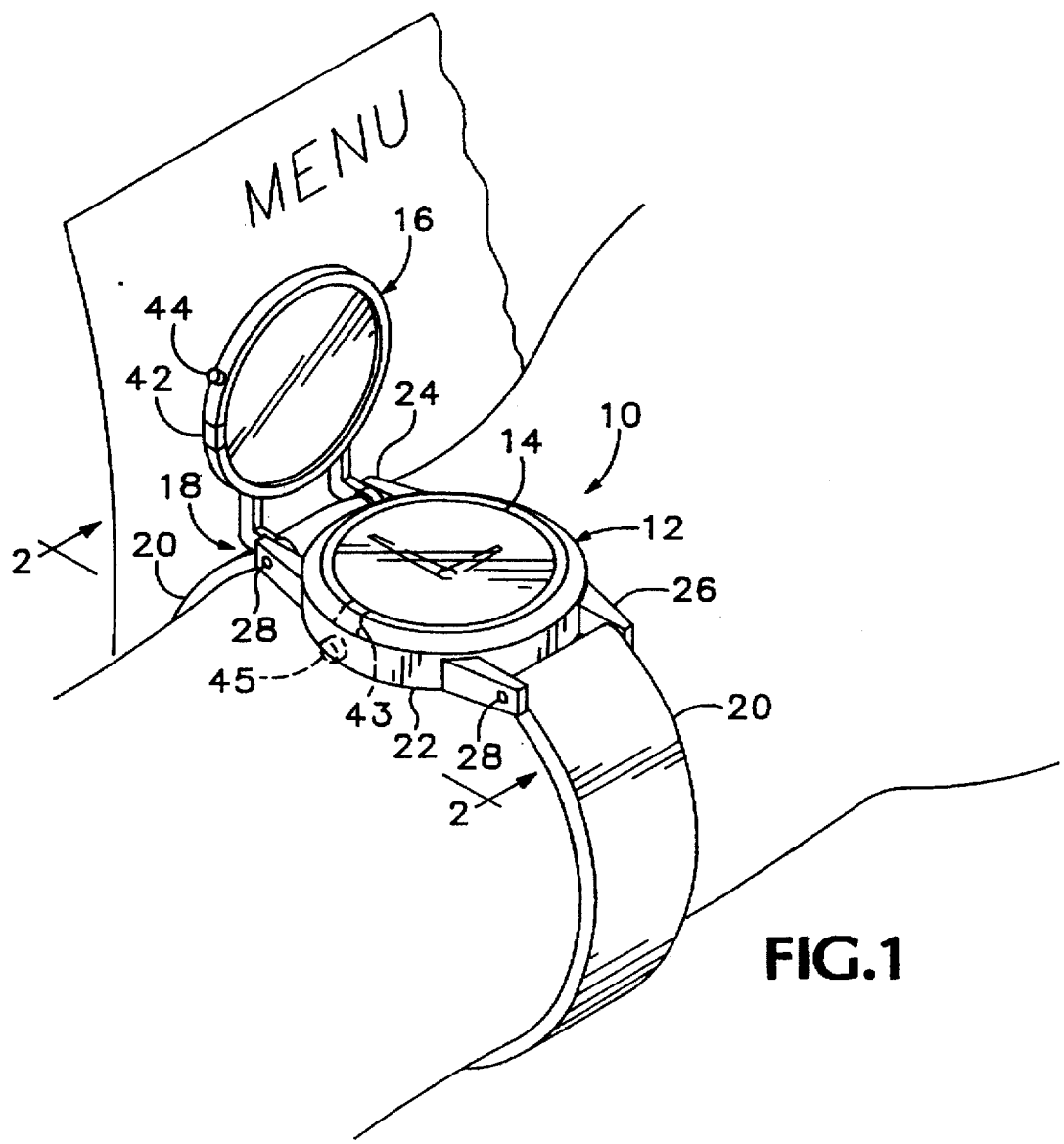
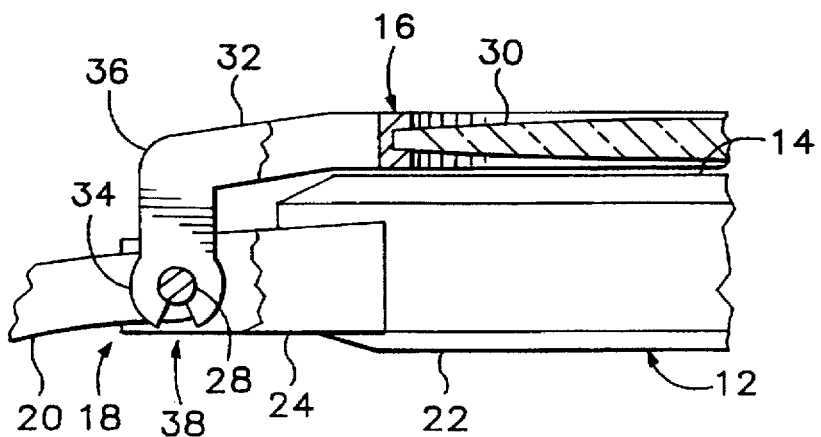

TIMEKEEPING AND MAGNIFYING DEVICE

BACKGROUND OF THE INVENTION

This invention relates to timekeeping and magnifying devices. More particularly, it relates to a device containing a watch and a pivotally attached magnifying lens.

A watch is used for keeping time and generally includes a face and either digital or analog timekeeping means, or both. Other features which may be contained in a watch are date keeping means, a stop watch, an alarm, a light, etc. Additionally, a watch may have a band so that is can be worn on a user's wrist. Alternatively, a watch may be carried in a user's pocket or elsewhere.

A magnifying lens is used to enlarge the image of an object. People with poor eyesight often use a magnifying lens to see small objects or to read small print, such as newspaper text, prices, menu items, etc. Also, magnifying lenses often are used to inspect small objects, regardless of the user's eyesight. Children especially like to use magnifying lenses as educational devices for examining objects, such as rocks, insects, etc.

People with poor vision often need both a watch and a magnifying lens. Additionally, people with poor vision often do not have a magnifying lens with them when they need to enlarge the image of an object so that it may be clearly seen. Therefore, the present invention is a timekeeping and magnifying device which combines both a watch and a magnifying lens. Prior to this invention, a watch and a pivotally attached magnifying lens have not been combined in one handy, inexpensive device.

SUMMARY OF THE INVENTION

The invented timekeeping and magnifying device includes a watch which has a face and a magnifying lens. The magnifying lens is positioned adjacent the face of the watch. A hinge connects the magnifying lens with the watch and allows the magnifying lens to pivot away from the face so that a user may use the magnifying lens to magnify objects.

In one embodiment of the invention, the device further includes a housing adjacent the face and an adjustable band connected to the housing. In this embodiment, the hinge is interposed between the band and the housing. In other variations of the invention, the device includes a light adjacent the magnifying lens to facilitate the use of the magnifying lens in dark areas or a fastener on the housing which is designed to restrict the magnifying lens from accidentally pivoting away from the face of the watch.

Another embodiment of the invention involves one of the previously described devices, only further including a second magnifying lens and a second hinge. The second hinge connects the second magnifying lens to the watch and allows the second magnifying lens to pivot away from the face of the watch. The second hinge connects the second magnifying lens to the watch in a location which permits the second magnifying lens to be substantially opposed to the first magnifying lens when the lenses are pivoted away from the face of the watch. In this position, the lenses cooperate to create a telescope-like combination. Other variations of this embodiment include using a concave lens in place of at least one of the magnifying lenses.

A further aspect of the invention comprises a method for using a timekeeping and magnifying device which includes a watch having a face and a housing surrounding the face, a magnifying lens, and a hinge pivotally connecting the magnifying lens and the watch. The method includes the steps of: (1) pivoting the magnifying lens away from the face of the watch; (2) positioning the magnifying lens in a spaced relationship between the user's eye and an object to be magnified; (3) orientating the magnifying lens to the user's eye so that the magnifying lens is substantially perpendicular to the user's line of sight; (4) looking through the magnifying lens at the object to be magnified; and (5) adjusting the position of the magnifying lens between the user's eye and the object to be magnified to focus the image seen by the user.

Variations of this further aspect of the present invention involve a pivoting step which includes the step of unfastening the magnifying lens from the watch. In other variations, the pivoting step includes the step of detaching the magnifying lens from the device.

Various other features, objects and advantages of the present invention will become fully apparent as this description continues.

BRIEF DESCRIPTION OF THE DRAWINGS

FIG. 1 is a view of the invented timekeeping and magnifying device being worn on a user's wrist and used to magnify a portion of a menu.

FIG. 2 is an enlarged cross-sectional view of the device shown in FIG. 1 taken generally along the line 2—2 in FIG. 1 with sections broken away and the magnifying lens pivoted to be in its "at rest" position.

DETAILED DESCRIPTION OF THE PREFERRED EMBODIMENT

Figure 3:
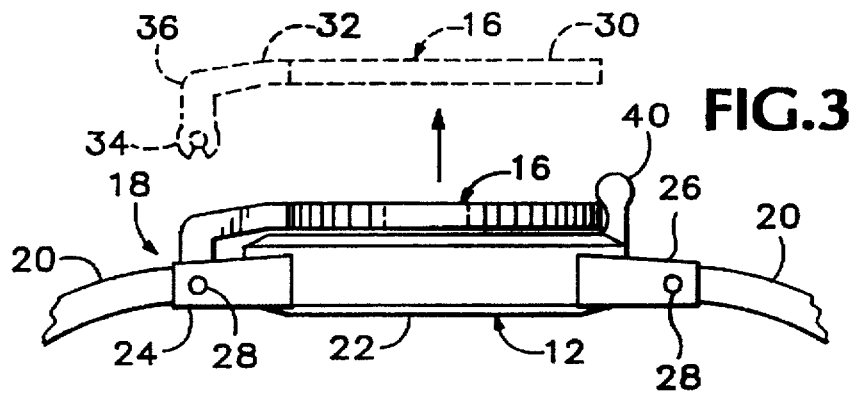
FIG. 3 is a side view of a second embodiment of the invention.

Referring now to the drawings, FIG. 1 depicts the timekeeping and magnifying device of the invention, indicated generally at 10. As shown in FIG. 1, the device 10 is being worn on a user's wrist and used to magnify a portion of a menu. The device 10 includes a watch 12 and a magnifying lens 16. The watch 12 further includes a face 14 and a housing 22 adjacent the face 14. A hinge 18 pivotally connects the magnifying lens 16 with the watch 12 and allows the magnifying lens 16 to pivot away from the face 14 so that a user may use the lens 16 to magnify objects. The hinge 18 allows that magnifying lens 16 to pivot from an "at rest" position, where it is adjacent to and substantially parallel to the face 14, to an "in use" position, where it is pivoted sufficiently away from the face 14 to allow the user to view the magnified image of an object. Preferably, the angle formed between the face 14 and the lens 16 when the lens 16 is in its "in use" position is between approximately 90° and approximately 180°, however, angles outside of this range are also acceptable. When the lens 16 is in its "at rest" position, the face 14 of the watch 12 is magnified.

As shown in FIG. 1, the watch 12 is a conventional analog wrist watch. It should be understood that the present invention may be practiced using any form of digital and/or analog wrist watch, pocket watch, or other form of watch. As stated, the watch 12 includes a face 14, and, as shown in FIG. 1, the face 14 is circular. It should be understood that the face 14 can be of any geometric shape. The face 14 is formed of a transparent material, such as glass or clear plastic. Additionally, the face 14 may be coated with an anti-reflective or scratch-resistant coating.

The watch 12 also contains a housing 22 adjacent the face 14. The housing 22 is formed of a suitable material, such as plastic or metal. In the preferred embodiment, the housing 22 includes opposed end regions 24 and 26. The end regions 24 and 26 each are designed to receive a pin 28.

Pins 28 connect each end region 24 and 26 of the housing 22 with an adjustable band 20, as is conventional with watches. The band 20 is designed to retain the device 10 around a user's wrist. The band 20 may be formed from a variety of materials, so long as it retains the device 10 around a user's wrist. Examples of suitable materials include, but are not limited to, fabric, metal, plastic, and leather. Preferably, the band 20 is adjustable so that the device 10 may be used on a variety of different sized wrists. This adjustable characteristic also may be achieved by forming the band out of an elastomeric material. Alternatively, the band 20 comprises a plurality of interconnected sections which allow the band 20 to be selectively loosened or tightened, depending on a user's preference and wrist size.

The magnifying lens 16 is formed of a clear material, such as glass or clear plastic. Preferably, the lens 16 is sized to conform to the shape of the face 14, but it may take many shapes, including the shapes of animals or characters to attract the use of the device 10 by children. As shown in FIG. 2, the magnifying lens 16 comprises a convex portion 30 and a frame portion 32. The convex portion is shaped to provide a predetermined degree of magnification. Preferably both sides of the lens 16 have convex surfaces. Other lens configurations are possible, including, but not limited to, a lens with a convex surface on only one side, a lens with a both a convex and a concave side, and a lens in which one side is substantially planar. Furthermore, the lens 16 could be a prescription eyeglass lens.

The frame portion 32 integrally includes a pin receiving portion 34 and an elbow bend 36. The elbow bend 36 connects the pin receiving portion 34 with the remainder of the frame portion 32 so that the pin receiving portion 34 is substantially perpendicular to the remainder of the frame portion 32. This configuration allows the pin receiving portion 34 to be connected to the pin 28 while also allowing the convex portion 30 of the lens 16 to be pivoted into its "at rest" position, where it is substantially parallel to and adjacent to the face 14.

As shown in FIG. 2, the pin receiving portion 34 substantially encircles the pin 28, except for a curved gap 38 which is defined by the pin receiving portion 34. The gap 38 enlarges as its distance from the pin 28 increases. This configuration allows the magnifying lens 16 to be easily detached from the device 10 by pulling the frame portion 32 away from the pin 28. Once detached, the lens 16, as depicted in dashed lines in FIG. 3, can be used to magnify the image of an object without requiring that the entire device 10 be positioned near the object. The design of the frame portion 32 allows the lens 16 to be easily reattached to the pin 28. Moreover, the lens 16 also can be pivoted about the pin 28 without detaching the lens 16 from the device 10.

A hinge 18 connects the magnifying lens 16 with the watch 12 and allows the lens 16 to pivot away from the face 14 so that a user may use the magnifying lens 16 to magnify objects. The hinge 18 may be any suitable device which pivotally connects two objects. In the preferred embodiment, the hinge 18 is comprised of one of the pins 28 which connects the band 20 to the housing 22 and the pin receiving portion 34 of the lens 16, as shown in FIG. 2. In this embodiment, the lens 16 is interposed between the band 20 and the housing 22.

As shown in FIG. 3, the device 10 may contain a fastener 40 on the housing 22 which is designed to restrict the magnifying lens 16 from accidentally pivoting away from the face 14. The fastener 40 may be formed of any suitable durable material, such as metal or hard plastic, and may be of any suitable shape. Preferably, the fastener 40 is formed of the same material as the housing 22. As shown in FIG. 3, the fastener 40 has a generally spherical shape and is located on the housing 22 opposite the hinge 18. The fastener 40 frictionally holds the lens 16 adjacent the face 14 and is released by slightly deforming or bending the fastener 40 away from the lens 16. To use the magnifying lens 16, a user merely unfastens the lens 16 from the fastener 40 and pivots the lens 16 away from the face 14. Alternatively, the friction between the pin receiving portion 34 of the magnifying lens 16 and the pin 28 may perform this fastening function. Furthermore, the fastener 40 may comprise a plurality of units, at least one of which is located on the magnifying lens 16 and at least one of which is located on the watch 12. Those units cooperate to restrict the lens 16 from pivoting away from the face 14.

As shown in FIG. 1, the device 10 may also contain a light 42 adjacent the lens 16. The light 42 is close enough to the convex portion 30 of the lens 16 to illuminate the convex portion 30 and a region of space adjacent the convex portion 30 to allow the magnified image of the viewed object to be seen, even in dark areas. Alternatively, as shown in dashed lines in FIG. 1, the light may be contained in the housing 22 of the watch 12, as shown at 43 in FIG. 1. Light 42 is actuated by a button 44 on the lens 16, and light 43 is actuated by a button 45 on the watch 12.

Another embodiment of the invention includes the previously described watch 12 and lens 16, and further includes a connector which removably holds the magnifying lens 16 over the face 14 of the watch 12, allowing the magnifying lens 16 to be detached from the watch 12. The connector may, but does not necessarily, allow the lens 16 to pivot away from the face 12. The combination of the hinge 18 and fastener 40 depicted in FIG. 3 is an example of a connector which holds the lens 16 over the face 14. Alternatively, the hinge 18 itself may be an example of a connector if the friction between the pin 28 and the pin receiving portion 34 of the lens 16 is sufficient to hold the lens 16 over the face 14. Other variations of this connector exist. Examples of other variations include, but are not limited to, a plurality of prongs on the lens 16 which engage the watch 12 or the band 20, a plurality of magnets and magnetic materials on the lens 16 and the watch 12, and a compression fit between the lens 16 and the watch 12.

Figure 4:
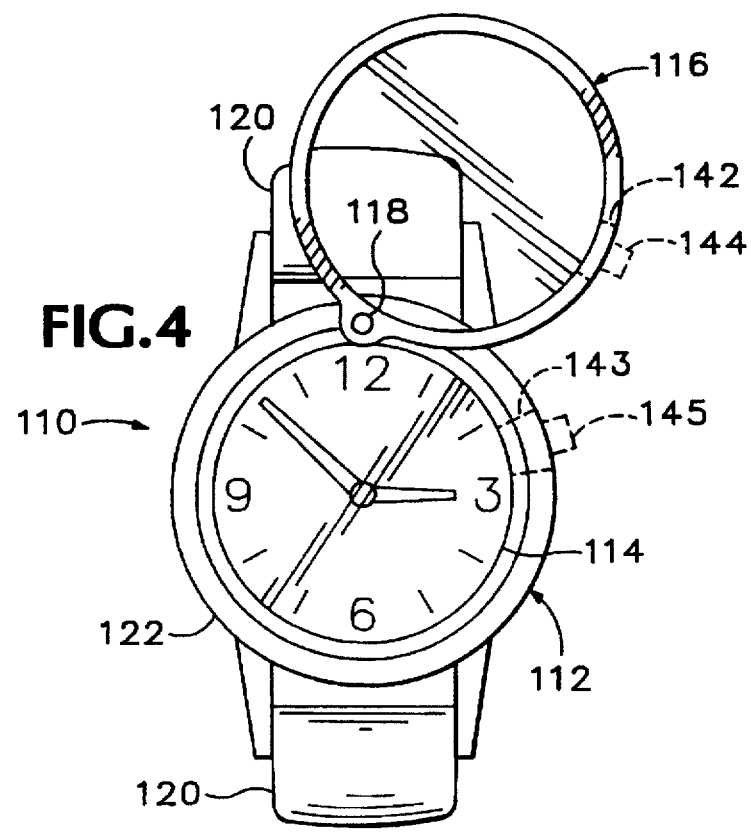
FIG. 4 is a top view of an alternate embodiment of the invention.

An alternate embodiment of the invention is shown in FIG. 4, and generally indicated at 110. In this embodiment, the device 110 still includes a watch 112 and a magnifying lens 116. The watch 112 includes a face 114 and a housing 122 which is connected to an adjustable band 120. Furthermore, this embodiment also may contain a light 142 adjacent the lens 116. The light 142 is actuated by a button 144 on the lens 116. Alternatively, the light and the button may be connected to the watch 112, as shown in dashed lines in FIG. 4 at 143 and 145 respectively. In this embodiment, the hinge is a pin 118 on the watch 112. The pin 118 allows the lens 116 to pivot rotationally in a plane substantially parallel to the face 114 of the watch 112.

Figure 5:
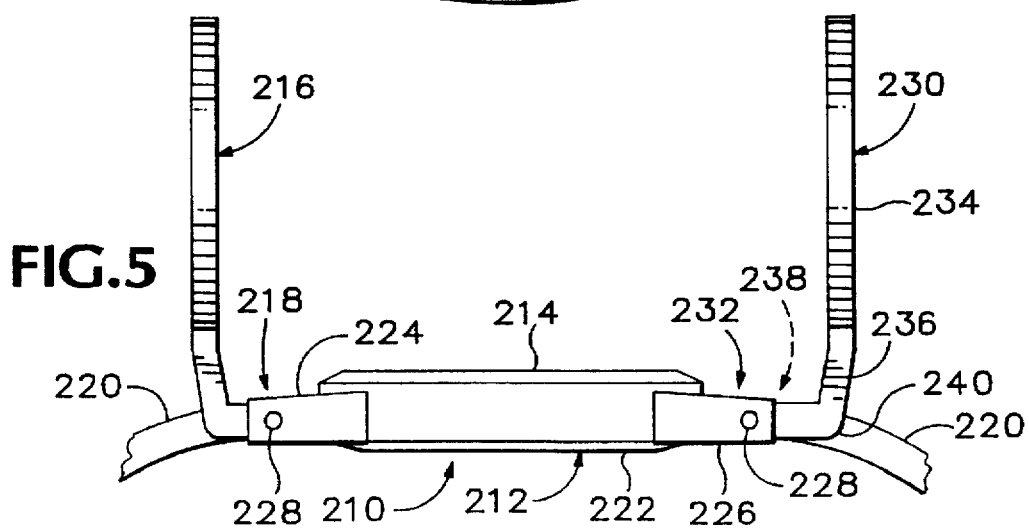
FIG. 5 is a side view of an other embodiment of the invention with sections broken away.

FIG. 5 depicts a further embodiment of the invention. In this embodiment, the device 210 includes the same general components as the preferred embodiment, including, but not limited to a watch 212, a face 214, a housing 222 with opposed end regions 224 and 226, a magnifying lens 216, an adjustable band 220, pins 228, and a hinge 218. Additionally, this embodiment further includes a second magnifying lens 230 and a second hinge 232. The second magnifying lens 230 is substantially similar to and has the same subcomponents as the first magnifying lens 216, including, but not limited to, a convex portion 234 and a frame portion 236 which includes a pin receiving portion 238 and an elbow bend 240.

The second hinge 232 pivotally connects the second magnifying lens 230 with the watch 212 and allows the second magnifying lens 230 to pivot away from the face 214 of the watch 212. Preferably, the second hinge 232 is comprised of the pin receiving portion 240 of the second lens 230 and the pin 228 which connects the second end region 226 of the housing 222 with the band 220. The second hinge 232 connects the second magnifying lens 230 to the watch 212 in a location which permits the first and second magnifying lenses 216 and 230 to be substantially opposed when the lenses each are pivoted approximately 90° away from the face 214. In this position, the lenses 216 and 230 cooperate to create a telescope-like combination.

It is important that the distance between the pin receiving portion 238 and the elbow bend 240 of second magnifying lens 230 be greater than the distance between the corresponding portions 34 and 36 of the first magnifying lens 16. Otherwise, both lenses 216 and 230 could not be pivoted to be in "at rest" positions, where they are both generally parallel to and adjacent to the face 214. In this configuration, when the lenses 216 and 230 are both in their "at rest" positions, the first magnifying lens 216 will be intermediate the face 214 and the second magnifying lens 230.

Other variations of this embodiment are possible. As an example, the lenses 216 and 230 may be selected to have focal lengths which produce a microscope-like combination as opposed to a telescope-like combination. Additionally, it is possible that at least one of the lenses 216 and 230 contain at least one concave surface or at least one planar surface. Different combinations of convex, concave and planar lens surfaces enable the device 10 to be utilized for a variety of different image-enhancing uses, including examining objects both close to the device 10 and at a distance. This feature is particularly advantageous when the device 10 is used by children as an educational device.

Method of Using the Preferred Embodiment

To use the device 10 shown in FIG. 1, the magnifying lens 16 must first be pivoted away from the face 14 of the watch 12 to its "in use" position. Preferably, this "in use" position is between approximately 90° and approximately 180° away from the face 14 of the watch 12, but angles outside of this range are also acceptable. Next, the lens 16 is positioned in a spaced relationship between the user's eye and the object to be magnified. Once positioned, the lens 16 should be oriented to the user's eye so that the magnifying lens is substantially perpendicular to the user's line of sight. This provides the best magnified view of the object. Next, the user simply looks through the magnifying lens at the object to be magnified. Finally, the magnified image of the object is focused by adjusting the position of the magnifying lens 16 between the user's eye and the object. Preferably, this involves moving the lens 16 forwardly or backwardly along the user's line of sight while maintaining the perpendicular orientation of the lens 16.

If variations of the device shown in FIG. 10 are used, the pivoting step of the method for using the device 10 may contain additional procedures. When the device 10 contains a fastener 40, as shown in FIG. 3, the lens 16 must be unfastened from the fastener 40 before it can be pivoted away from the face 14. Furthermore, if the object to be magnified is located in a dark area, the light 42 adjacent the lens 16 should be used to illuminate the object.

Alternatively, the lens 16 may be removed from the watch 12 before being used to magnify the image of an object. As previously described, the preferred embodiment of the lens 16 allows the lens 16 to be pivoted about the hinge 18 or detached from the hinge 18. Once removed from the watch 12, the same method is followed as is described above.

While the preferred embodiment and best mode for practicing the invention have been described, modifications and changes may be made thereto without departing from the spirit of the invention.

I claim:

1. A timekeeping and magnifying device, comprising:
   a watch having a face;
   a magnifying lens, wherein the magnifying lens is positioned adjacent the face; and
   a hinge detachably and pivotally connecting the magnifying lens with the watch, wherein the hinge allows the magnifying lens to pivot away from the face and to be completely detached from and reattached to the watch without requiring disassembly of any portion of the watch so that a user may use the magnifying lens to magnify objects.

2. The timekeeping and magnifying device of claim 1, further comprising a light adjacent and connected to the magnifying lens to facilitate the use of the magnifying lens in dark areas even when the magnifying lens is completely disconnected from the watch.

3. The timekeeping and magnifying device of claim 1, wherein the hinge includes a pin, wherein the magnifying lens includes a pin-receiving portion, and wherein the pin-receiving portion engages the pin and enables the magnifying lens to pivot about the pin and to be completely detached from and reattached to the pin without requiring the pin to be removed from the device.

4. The timekeeping and magnifying device of claim 3, wherein the pin-receiving portion includes a generally c-shaped member that defines a recess into which the pin is removably and pivotally received.

5. The timekeeping and magnifying device of claim 1, wherein the hinge has an axis of rotation substantially normal to the face of the watch and wherein the hinge allows the magnifying lens to pivot away from the face by rotating in a plane substantially parallel to the face and to be completely detached from and reattached to the watch.

6. The timekeeping and magnifying device of claim 5 wherein the hinge includes a pin extending substantially perpendicular to the face of the watch, and wherein the magnifying lens has a pin-receiving portion rotatably and removably mounted on the pin.

7. A timekeeping and magnifying device comprising:
   a watch having a face;
   a first magnifying lens, wherein the first magnifying lens is positioned adjacent the face;
   a first hinge connecting the first magnifying lens with the watch and allowing the first magnifying lens to pivot away from the face so that a user may use the first magnifying lens to magnify objects;
   a second magnifying lens; and a second hinge connecting the second magnifying lens with the watch and allowing the second magnifying lens to pivot away from the face of the watch, wherein the second hinge connects the second magnifying lens to the watch in a location which permits the second magnifying lens to be substantially opposed to the first magnifying lens when the first and second magnifying lens are pivoted away from the face so that the first and second magnifying lenses cooperate to create a telescope-like combination.

8. The timekeeping and magnifying device of claim 7, wherein the first hinge is configured to allow the first magnifying lens to be completely detached from the watch.

9. A timekeeping and magnifying device, comprising:

a watch having a face;

a magnifying lens positioned adjacent the face; and a connector on the watch, wherein the connector removably holds the magnifying lens over the face of the watch and wherein the connector allows the magnifying lens to be completely detached from the watch without requiring the disassembly of any portion of the watch.

10. A timekeeping and magnifying device, comprising:

a wash having a face and a housing that surrounds the face, wherein the housing has a first and a second opposed end regions;

a magnifying lens positioned adjacent the face of the watch;

an adjustable band having a first and a second end;

a first pin pivotally connecting the first end region of the housing and the first end of the band;

a second pin pivotally connecting the second end region of the housing and the second end of the band; and a hinge pivotally and detachably connecting the magnifying lens to the watch, wherein the hinge allows the magnifying lens to pivot in a direction away from the face of the watch and to be completely detached from and reattached to the watch while the first and the second pins maintain their connections between the housing and the ends of the band.

11. The timekeeping and magnifying device of claim 10 wherein the hinge includes the first pin, and wherein the magnifying lens includes at least one pin-receiving portion for pivotally and removably engaging the first pin.

12. The timekeeping and magnifying device of claim 10, wherein the device further includes a light adjacent and connected to the magnifying lens to facilitate the use of the lens in dark areas even when the magnifying lens is completely disconnected from the watch.

13. The timekeeping and magnifying device of claim 11, wherein the pin-receiving portion includes a generally c-shaped member that engages the first pin to enable the magnifying lens to pivot about the first pin and to be completely detached from and reattached to the first pin.

14. A timekeeping and magnifying device comprising:

a watch having a face and a housing that surrounds the face, wherein the housing has a first and a second opposed end regions;

a first magnifying lens positioned adjacent the face of the watch;

a first hinge pivotally connecting the first magnifying lens to the watch so that the first magnifying lens may pivot in a direction away from the face of the watch;

an adjustable band having a first and a second end;

a first pin pivotally connecting the first end region of the housing and the first end of the band;

a second pin pivotally connecting the second end region of the housing and the second end of the band;

a second magnifying lens; and a second hinge connecting the second magnifying lens with the watch and allowing the second magnifying lens to pivot in a direction away from the face of the watch, wherein the second hinge connects the second magnifying lens to the watch in a location which permits the second magnifying lens to be substantially opposed to the first magnifying lens when the first and second magnifying lenses are pivoted away from the face so that the first and second magnifying lenses cooperate to create a telescope-like combination.

15. The timekeeping and magnifying device of claim 14, wherein the second hinge includes the second pin, and wherein the second magnifying lens is mounted intermediate the housing and the second end of the band.

16. The timekeeping and magnifying device of claim 14, wherein the first hinge is configured to allow the first magnifying lens to be completely detached from the watch.

* * * * *